(12) United States Patent
Boyd (10) Patent No.: US 9,389,355 B2
(45) Date of Patent: Jul. 12, 2016

(54) STRUCTURED OPTICAL FILM

(71) Applicant: 3M INNOVATIVE PROPERTIES COMPANY, St. Paul, MN (US)

(72) Inventor: Gary T. Boyd, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 14/377,204

(22) PCT Filed: Mar. 7, 2013

(86) PCT No.: PCT/US2013/029654
§ 371 (c)(1),
(2) Date: Aug. 7, 2014

(87) PCT Pub. No.: WO2013/142084
PCT Pub. Date: Sep. 26, 2013

(65) Prior Publication Data
US 2016/0025919 A1    Jan. 28, 2016

Related U.S. Application Data

(60) Provisional application No. 61/613,143, filed on Mar. 20, 2012.

(51) Int. Cl.
*F21V 5/00* (2015.01)
*F21V 8/00* (2006.01)
*G02B 3/00* (2006.01)
*G02B 5/02* (2006.01)

(52) U.S. Cl.
CPC ............ *G02B 6/0053* (2013.01); *G02B 3/0043* (2013.01); *G02B 5/0221* (2013.01); *G02B 5/0231* (2013.01); *G02B 5/0278* (2013.01)

(58) Field of Classification Search
CPC .. G02B 3/0037; G02B 3/0043; G02B 5/0221; G02B 5/0231; G02B 5/0278; G02B 6/005; G02B 6/0051; G02B 6/0053
USPC ................. 362/330, 333, 606–607, 618–620, 362/624–627
See application file for complete search history.

(56) References Cited

U.S. PATENT DOCUMENTS

| | | | |
|---|---|---|---|
| 6,719,426 B2 | 4/2004 | Magarill |
| 7,328,638 B2 | 2/2008 | Gardiner |
| 7,350,442 B2 | 4/2008 | Ehnes |
| 8,608,363 B2 | 12/2013 | Weber |

(Continued)

FOREIGN PATENT DOCUMENTS

| WO | WO 00-48037 | 8/2000 |
| WO | WO 2008-144644 | 11/2008 |

(Continued)

OTHER PUBLICATIONS

International Search Report for PCT International Application No. PCT/US2013/029654, mailed on Jun. 4, 2013, 4pgs.

*Primary Examiner* — Jason Moon Han
(74) *Attorney, Agent, or Firm* — Clifton F. Richardson (57) ABSTRACT

An optical film includes a first structured major surface having a plurality of linear prisms extending along a same first direction and an opposing second structured major surface having a plurality of closely packed lenslets. The optical film exhibits a high optical uniformity and reduced sparkle.

20 Claims, 7 Drawing Sheets

(56) References Cited

U.S. PATENT DOCUMENTS

| | | |
|---|---|---|
| 8,662,687 B2 | 3/2014 | Weber |
| 2005/0191026 A1 | 9/2005 | Miyashita |
| 2008/0064133 A1 | 3/2008 | Lee |
| 2009/0122576 A1 | 5/2009 | Sato |
| 2010/0214762 A1 | 8/2010 | Nevitt |
| 2010/0309406 A1 | 12/2010 | Kim |

FOREIGN PATENT DOCUMENTS

| | | |
|---|---|---|
| WO | WO 2010-059566 | 5/2010 |
| WO | WO 2010-059568 | 5/2010 |
| WO | WO 2010-059579 | 5/2010 |
| WO | WO 2010-141261 | 12/2010 |

STRUCTURED OPTICAL FILM

FIELD

The disclosure relates to structured optical film and, in particular, a structured optical film that has a high optical uniformity.

BACKGROUND

Display systems, such as liquid crystal display (LCD) systems, are used in a variety of applications and commercially available devices such as, for example, computer monitors, personal digital assistants (PDAs), mobile phones, miniature music players, and thin LCD televisions. Most LCDs include a liquid crystal panel and an extended area light source, often referred to as a backlight, for illuminating the liquid crystal panel. Backlights typically include one or more lamps and a number of light management films such as, for example, lightguides, mirror films, light redirecting films, retarder films, light polarizing films, and diffuser films. Diffuser films are typically included to hide optical defects and improve the brightness uniformity of the light emitted by the backlight.

BRIEF SUMMARY

The present disclosure relates to structured optical film and, in particular, a structured optical film that has a high optical uniformity and reduced sparkle, among other aspects. The optical film includes a first structured major surface having a plurality of linear prisms extending along a same first direction and an opposing second structured major surface having a plurality of closely packed lenslets. The second structured major surface has an optical haze in the range from about 3% to about 25%. The optical film exhibits a high optical uniformity and reduced sparkle.

In many embodiments the optical film includes a first structured major surface having a plurality of linear prisms extending along a same first direction and an opposing second structured major surface having a plurality of closely packed lenslets. Each lenslet has a largest lateral dimension D, an equivalent circular diameter ECD and a finite focal length f corresponding to a focal spot. The plurality of closely packed lenslets having an average largest lateral dimension $D_{avg}$, an average equivalent circular diameter $ECD_{avg}$ and an average focal length $f_{avg}$, $ECD_{avg}/f_{avg}$ being in a range from about 0.05 to about 0.20, $D_{avg}$ being less than about 50 micrometers, and less than about 30% of the second structured major surface having a slope magnitude that is greater than about 5 degrees.

In further embodiments the optical film includes a first structured major surface having a plurality of linear prisms extending along a same first direction and an opposing second structured major surface having a plurality of closely packed lenslets. Each lenslet has an equivalent circular diameter ECD and a finite focal length f corresponding to a focal spot. The plurality of closely packed lenslets have an average equivalent circular diameter $ECD_{avg}$ and an average focal length $f_{avg}$, $ECD_{avg}/f_{avg}$ being in a range from about 0.05 to about 0.20, at least 90% of the lenslets in the plurality of closely packed lenslets having a nearest neighbor focal spot distance of less than about 30 micrometers, less than about 30% of the second structured major surface having a slope magnitude that is greater than about 5 degrees.

In some embodiments the optical film includes a first structured major surface having a plurality of linear prisms extending along a same first direction and an opposing second structured major surface having a plurality of closely packed lenslets. Each lenslet has a largest lateral dimension D, the plurality of closely packed lenslets having an average largest lateral dimension $D_{avg}$, $D_{avg}$ being less than about 50 micrometers, at least 90% of the lenslets in the plurality of closely packed lenslets having a nearest neighbor focal spot distance of less than about 30 micrometers, less than about 30% of the second structured major surface having a slope magnitude that is greater than about 5 degrees.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

The disclosure may be more completely understood in consideration of the following detailed description of various embodiments of the disclosure in connection with the accompanying drawings, in which.

The schematic drawings presented herein are not necessarily to scale. Like numbers used in the figures refer to like components, steps and the like. However, it will be understood that the use of a number to refer to a component in a given figure is not intended to limit the component in another figure labeled with the same number. In addition, the use of different numbers to refer to components is not intended to indicate that the different numbered components cannot be the same or similar.

DETAILED DESCRIPTION

In the following detailed description, reference is made to the accompanying drawings that form a part hereof, and in which are shown by way of illustration several specific embodiments of devices, systems and methods. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

Any direction referred to herein, such as "top," "bottom," "left," "right," "upper," "lower," "above," below," and other directions and orientations are described herein for clarity in reference to the figures and are not to be limiting of an actual device or system or use of the device or system. Many of the devices, articles or systems described herein may be used in a number of directions and orientations.

The present disclosure describes structured optical film and, in particular, a structured optical film that has a high optical uniformity and reduced sparkle, among other aspects. The optical film includes a first structured major surface having a plurality of linear prisms extending along a same first direction and an opposing second structured major surface having a plurality of closely packed lenslets. The second structured major surface has an optical haze in the range from about 3% to about 25%. The optical film exhibits a high optical uniformity and reduced sparkle when used in conjunction with a prism film below it. It has been found that this haze range can be created while minimizing sparkle using a collection of lenslets within a certain size range and shape. While the present disclosure is not so limited, an appreciation of various aspects of the disclosure will be gained through a discussion of the examples provided below.

The structured optical film described herein can include a plurality of linear prisms and a matte structure on an opposing side of the structured optical film. The matte structure can be a plurality of closely packed lenslets that can be formed by microreplication, for example. The matte structure is configured to reduce or minimize an optical artifact known as "sparkle".

One purpose of the matte surface (i.e., closely packed lenslets) is to generally improve the spatial and angular uniformity in illumination of an LCD backlight system. This matte surface can help to reduce or eliminate a variety of optical articles including, moiré, for example. It also hides color non-uniformities resulting from prism dispersion reflected from the lower substrate surface. However, it has been found that certain matte surfaces can introduce optical defects such as sparkle. "Sparkle" refers to an optical artifact that appears as a grainy texture (texture mura) that consists of small regions of bright and dark luminance in what appears to be a random pattern. The position of the bright and dark regions can vary as the viewing angle changes, making the texture especially evident and objectionable to a viewer.

Sparkle appears is result of an optical interaction between a matte structure and another structure beneath it, referred to here as an object. For example, the object may by a set of regular pixels of an LCD, and the matte structure may be a film placed immediately above it to reduce display glare. Such sparkle tends to be multi-colored as the matte surface interacts with the LCD color filter matrix. Configuration of the matte surface or closely packed lenslets, as described herein has been found to reduce or eliminate sparkle.

Figure 1:
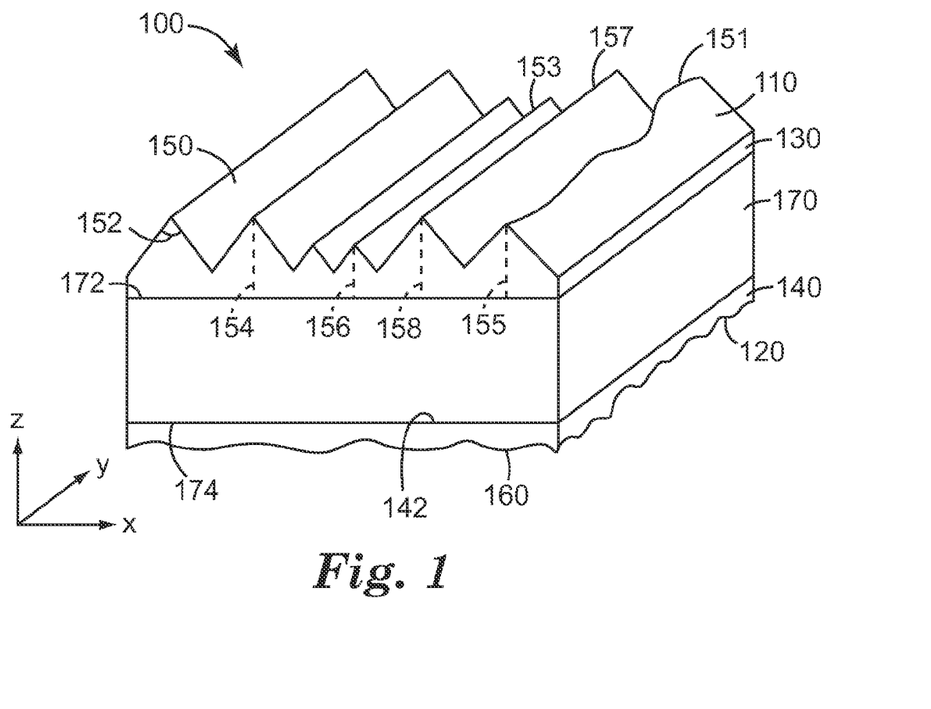
FIG. 1 is a schematic side view of a structured optical film.

FIG. 1 is a schematic side view of a structured optical film 100. The structured optical film 100 includes an array of linear microstructures 150 for improving brightness and a matte surface 160 for improving display cosmetics. The optical haze of the matte surface is less than 25% or in a range from 3 to 25% or in a range from 5 to 20% to maintain brightness, and the size/configuration of the closely packed lenslets are sized to reduce or eliminate sparkle.

Structured optical film 100 includes a first major or structured surface 110 that includes a plurality of microstructures or linear prisms 150 that extend along the y-direction. Structured optical film 100 includes a second major or structured surface 120 that is opposite first major or structured surface 110 and includes a plurality of microstructures or lenslets 160.

Structured optical film 100 can include a substrate layer 170 that is disposed between respective first and second major surfaces 110 and 120 and includes a first major surface 172 and an opposing second major surface 174. Structured optical film 100 can include a prism layer 130 that is disposed on first major surface 172 of the substrate layer and includes first major surface 110 of the structured optical film 100, and a matte layer 140 that is disposed on second major surface 174 of the substrate layer and includes second major surface 120 of the structured optical film 100. The matte layer 140 has a major surface 142 opposite major surface 120.

The exemplary structured optical film 100 includes three layers 130, 170 and 140. In general, the structured optical film 100 can have one or more layers. For example, in some cases, the structured optical film 100 can have a single layer that includes respective first and second major surfaces 110 and 120. As another example, in some cases, the structured optical film 100 can have many layers. For example, in such cases, substrate 170 can have multiple layers.

Microstructures 150 can be designed to redirect light that is incident on major surface 120 of the structured optical film 100, along a desired direction, such as along the positive z-direction. In the exemplary structured optical film 100, microstructures 150 are prismatic linear structures. In general, microstructures 150 can be any type microstructures that are capable of redirecting light by, for example, refracting a portion of an incident light and recycling a different portion of the incident light. For example, the cross-sectional profiles of microstructures 150 can be or include curved and/or piecewise linear portions. For example, in some cases, microstructures 150 can be linear cylindrical lenses extending along the y-direction.

Each linear prismatic microstructure 150 includes an apex angle 152 and a height 154 measured from a common reference plane such as, for example, major plane surface 172. In some cases, such as when it is desirable to reduce optical coupling or wet-out and/or improve durability of the light redirecting film, the height of a prismatic microstructure 150 can change along the y-direction. For example, the prism height of prismatic linear microstructure 151 varies along the y-direction. In such cases, prismatic microstructure 151 has a local height that varies along the y-direction, a maximum height 155, and an average height. In some cases, a prismatic linear microstructure, such as linear microstructure 153, has a constant height along the y-direction. In such cases, the microstructure has a constant local height that is equal to the maximum height and the average height.

In some cases, such as when it is desirable to reduce optical coupling or wet-out, some of the linear microstructures are shorter and some of the linear microstructures are taller. For example, height 156 of linear microstructure 153 is smaller than height 158 of linear microstructure 157.

Apex or dihedral angle 152 can have any value that may be desirable in an application. For example, in some cases, apex angle 152 can be in a range from about 70 degrees to about 110 degrees, or from about 80 degrees to about 100 degrees, or from about 85 degrees to about 95 degrees. In some cases, microstructures 150 have equal apex angles which can, for example, be in a range from about 88 or 89 degrees to about 92 or 91 degrees, such as 90 degrees.

Prism layer 130 can have any index of refraction that may be desirable in an application. For example, in some cases, the index of refraction of the prism layer is in a range from about 1.4 to about 1.8, or from about 1.5 to about 1.8, or from about 1.5 to about 1.7. In some cases, the index of refraction of the prism layer is not less than about 1.5, or not less than about 1.55, or not less than about 1.6, or not less than about 1.65, or not less than about 1.7.

In some cases, such as when structured optical film 100 is used in a liquid crystal display system, the structured optical film 100 can increase or improve the brightness of the display. In such cases, the light redirecting film has an effective transmission or relative gain that is greater than 1. As used herein, effective transmission is the ratio of the luminance of the display system with the film in place in the display system to the luminance of the display without the film in place.

Effective transmission (ET) can be measured using optical system centered on an optical axis and includes a hollow lambertian light box that emits a lambertian light through an emitting or exit surface, a linear light absorbing polarizer, and a photo detector. Light box is illuminated by a stabilized broadband light source that is connected to an interior of the light box via an optical fiber. A test sample, the ET of which is to be measured by the optical system, is placed at a location between the light box and the absorbing linear polarizer.

The ET of the structured optical film 100 can be measured by placing the structured optical film 100 at the location between the light box and the absorbing linear polarizer with linear prisms 150 facing the photo detector and microstructures 160 facing the light box. Next, the spectrally weighted axial luminance $I_1$ (luminance along optical axis) is measured through the linear absorbing polarizer by the photo detector. Then, the structured optical film 100 is removed and the spectrally weighted luminance $I_2$ is measured without the structured optical film 100. ET is the ratio $I_1/I_2$. ETO is the effective transmission when linear prisms 150 extend along a direction that is parallel to the polarizing axis of linear absorbing polarizer, and ET90 is the effective transmission when linear prisms 150 extend along a direction that is perpendicular to the polarizing axis of the linear absorbing polarizer. The average effective transmission (ETA) is the average of ET0 and ET90.

Effective transmission values disclosed herein were measured using a SpectraScan™ PR-650 SpectraColorimeter (available from Photo Research, Inc, Chatsworth, Calif.) for photo detector. Light box is a Teflon cube with a total reflectance of about 85%.

In some cases, such as when structured optical film 100 is used in a display system to increase the brightness and the linear prisms have an index of refraction that is at least about 1.6, the average effective transmission (ETA) of the light redirecting film is at least about 1.3, or at least 1.5, or at least 1.7, or at least 1.9, or at least 2.1.

Figure 2:
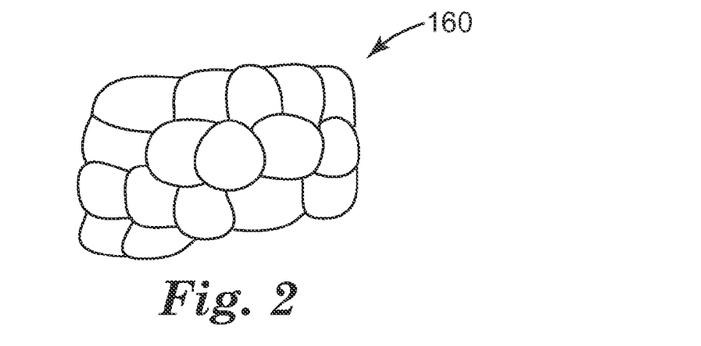
FIG. 2 is a schematic top view of closely packed lenslets.

FIG. 2 is a schematic top view of closely packed lenslets 160, where by closely packed it is meant that at least 90%, or at least 92%, or at least 94%, or at least 96%, or at least 98%, or at least 99% of major surface 174 is covered by the lenslets.

The closely packed lenslets 160 are configured to reduce or minimize sparkle with no, or very little, adverse effect on the capabilities of the light redirecting film to redirect light and enhance brightness. For example, the average effective transmission of the structured optical film 100 is not less or is less than by no more than about 10%, or 8%, or 6%, or 5%, or 4% or 3% as compared to an optical film that has the same construction except that the second major surface is not structured, i.e., with closely packed lenslets 160.

The configuration of the closely packed lenslets 160 to reduce or minimize sparkle with no, or very little, adverse effect on the capabilities of the light redirecting film to redirect light and enhance brightness can be described in a number ways including, largest lateral dimension D, average largest lateral dimension $D_{avg}$, finite focal length f, average focal length $f_{avg}$, D/f, $D_{avg}/f_{avg}$, equivalent circular diameter ECD, average equivalent circular diameter $ECD_{avg}$, $ECD_{avg}/f_{avg}$, peak height, nearest neighbor focal spot distance, and slope magnitude.

The second major surface 120 has an optical haze in a range from 3 to 25%, or from 5 to 20%. Optical haze, as used herein, is defined as the ratio of the transmitted light that deviates from the normal direction by more than 4 degrees to the total transmitted light. Haze values disclosed herein were measured using a Haze-Gard Plus haze meter (available from BYK-Gardiner, Silver Springs, Md.) according to the procedure described in ASTM D1003. Optical clarity, as used herein, refers to the ratio $(T_1-T_2)/(T_1+T_2)$, where $T_1$ is the transmitted light that deviates from the normal direction between 1.6 and 2 degrees from the normal direction, and $T_2$ is the transmitted light that lies between zero and 0.7 degrees from the normal direction. Clarity values disclosed herein were measured using a Haze-Gard Plus haze meter from BYK-Gardiner.

The closely packed lenslets 160 are convex. In many embodiments, the closely packed lenslets 160 are convex protrusions extending away from the substrate 170. In some cases, closely packed lenslets 160 form a regular pattern. In some cases, closely packed lenslets 160 form an irregular pattern as illustrated in FIG. 2. In some cases, closely packed lenslets 160 form a pseudo-random pattern that appears to be random.

The closely packed lenslets 160 can have an average lateral dimension $D_{avg}$ that is less than about 50 micrometers, or less than about 45 micrometers, or less than about 40 micrometers, or less than about 35 micrometers, or less than about 30 micrometers, or less than about 25 micrometers, or less than about 20 micrometers. In many embodiments at least 80% of the closely packed lenslets 160 have a largest lateral dimension D that is less than about 50 micrometers, or at least 80% of the closely packed lenslets have a largest lateral dimension D that is less than about 45 micrometers, or at least 80% of the closely packed lenslets have a largest lateral dimension D that is less than about 40 micrometers, or at least 40% of the closely packed lenslets have a largest lateral dimension D that is less than about 32 micrometers, or at least 20% of the closely packed lenslets 160 have a largest lateral dimension D that is less than about 24 micrometers.

The closely packed lenslets 160 can have an average focal length f corresponding to an average focal spot distance that is less than about 250 micrometers, or less than about 225 micrometers, or less than about 200 micrometers.

The closely packed lenslets 160 can have an equivalent circular diameter ECD. In many embodiments at least 80% of the closely packed lenslets have an equivalent circular diameter ECD that is less than about 27 micrometers, or at least 40% of the closely packed lenslets have an equivalent circular diameter ECD that is less than about 20 micrometers, or at least 20% of the closely packed lenslets have an equivalent circular diameter ECD that is less than about 14 micrometers.

The closely packed lenslets 160 can have an $ECD_{avg}/f_{avg}$ in a range from about 0.05 to about 0.20, or from about 0.05 to about 0.19, or from about 0.06 to about 0.19, or from about 0.06 to about 0.18, or from about 0.07 to about 0.18.

The closely packed lenslets 160 can have a peak height that is less than about 1.5 micrometers, or less than about 1.2 micrometers, or less than about 0.7 micrometers.

The closely packed lenslets 160 have a nearest neighbor focal spot distance. In many embodiments at least 90% of the closely packed lenslets have a nearest neighbor focal spot distance of less than about 30 micrometers, or at least 90% of the closely packed lenslets have a nearest neighbor focal spot distance of less than about 25 micrometers, or at least 40% of the closely packed lenslets have a nearest neighbor focal spot distance of less than about 18 micrometers, or at least 20% of the closely packed lenslets have a nearest neighbor focal spot distance of less than about 15 micrometers.

The closely packed lenslets 160 or second major surface 120 scatters light in a first direction with a first viewing angle $A_H$ and in a second direction orthogonal to the first direction with a second viewing angle $A_V$ substantially equal to $A_H$. In many embodiments a difference between $A_V$ and $A_H$ is less than 10 degrees or less than 5 degrees. In other embodiments, the closely packed lenslets 160 or second major surface 120 scatters light in a first direction with a first viewing angle $A_H$ and in a second direction orthogonal to the first direction with a second viewing angle $A_V$ substantially different from $A_H$. In these embodiments, the difference between $A_V$ and $A_H$ is greater than 15 degrees or greater than 20 or greater than 25 degrees.

The closely packed lenslets 160 or second structured surface 160 can be described as having a slope magnitude. Slope magnitude was determined using atomic force microscopy (AFM) applied to samples approximately 200 micrometers by 200 micrometers. Slopes $S_x$ and $S_y$ along respective x- and y-directions were calculated from the following two expressions:

$$S_x = \frac{\partial H(x, y)}{\partial x} \quad (1)$$

$$S_y = \frac{\partial H(x, y)}{\partial y} \quad (2)$$

where H(x,y) is the surface profile. The slopes $S_x$ and $S_y$ were calculated using a slope bin size of 0.5 degrees. A slope magnitude $S_m$ was calculated from the following expression:

$$S_m = \sqrt{\left[\frac{\partial H}{\partial x}\right]^2 + \left[\frac{\partial H}{\partial y}\right]^2} \quad (3)$$

Figure 12:
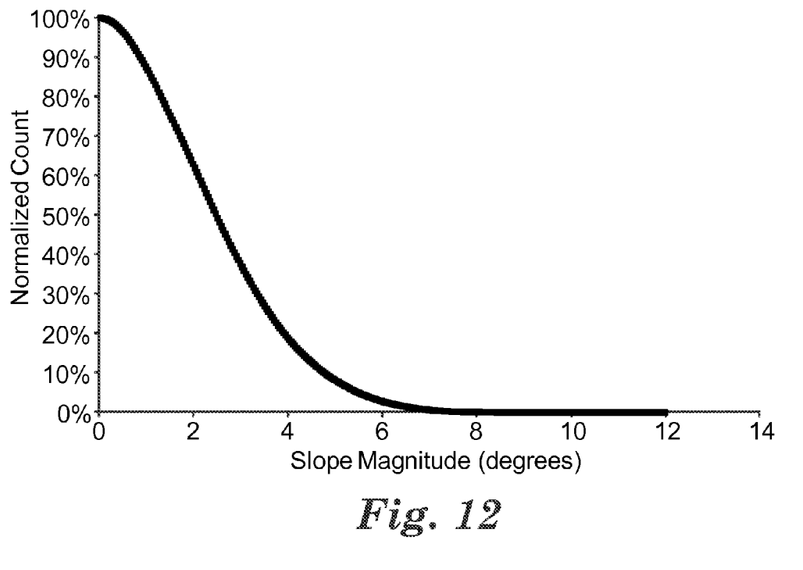
FIG. 12 is a graph of the cumulative distribution of a slope magnitude for a representative surface.

FIG. 12 shows the percent cumulative slope distribution $S_c(\ )$ for a representative embodiment where $S_c(\ )$ was calculated from the following expression:

$$S_c(\theta) = \frac{\int_\theta^\infty S_m}{\int_0^\infty S_m}$$

In many embodiments less than 30% of the second structured surface has a slope magnitude that is greater than about 5 degrees, or less than 20% of the second structured surface has a slope magnitude that is greater than about 5 degrees, or less than 15% of the second structured surface has a slope magnitude that is greater than about 5 degrees, or less than 10% of the second structured surface has a slope magnitude that is greater than about 5 degrees, or less than 40% of the second structured surface has a slope magnitude that is greater than about 4 degrees, or less than 30% of the second structured surface has a slope magnitude that is greater than about 4 degrees, or less than 25% of the second structured surface has a slope magnitude that is greater than about 4 degrees, or less than 50% of the second structured surface has a slope magnitude that is greater than about 3 degrees, or less than 45% of the second structured surface has a slope magnitude that is greater than about 3 degrees, or less than 40% of the second structured surface has a slope magnitude that is greater than about 3 degrees, or less than 80% of the second structured surface has a slope magnitude that is greater than about 2 degrees, or less than 70% of the second structured surface has a slope magnitude that is greater than about 2 degrees, or less than 65% of the second structured surface has a slope magnitude that is greater than about 2 degrees.

Microstructures or closely packed lenslets 160 can be made using any fabrication method that may be desirable in an application. For example, the closely packed lenslets 160 can be fabricated using microreplication from a tool, where the tool may be fabricated using any available fabrication method, such as by using engraving or diamond turning. Exemplary diamond turning systems and methods can include and utilize a fast tool servo (FTS) as described in, for example, PCT Published Application No. WO 00/48037, and U.S. Pat. Nos. 7,350,442 and 7,328,638, the disclosures of which are incorporated in their entireties herein by reference thereto.

Figure 10:
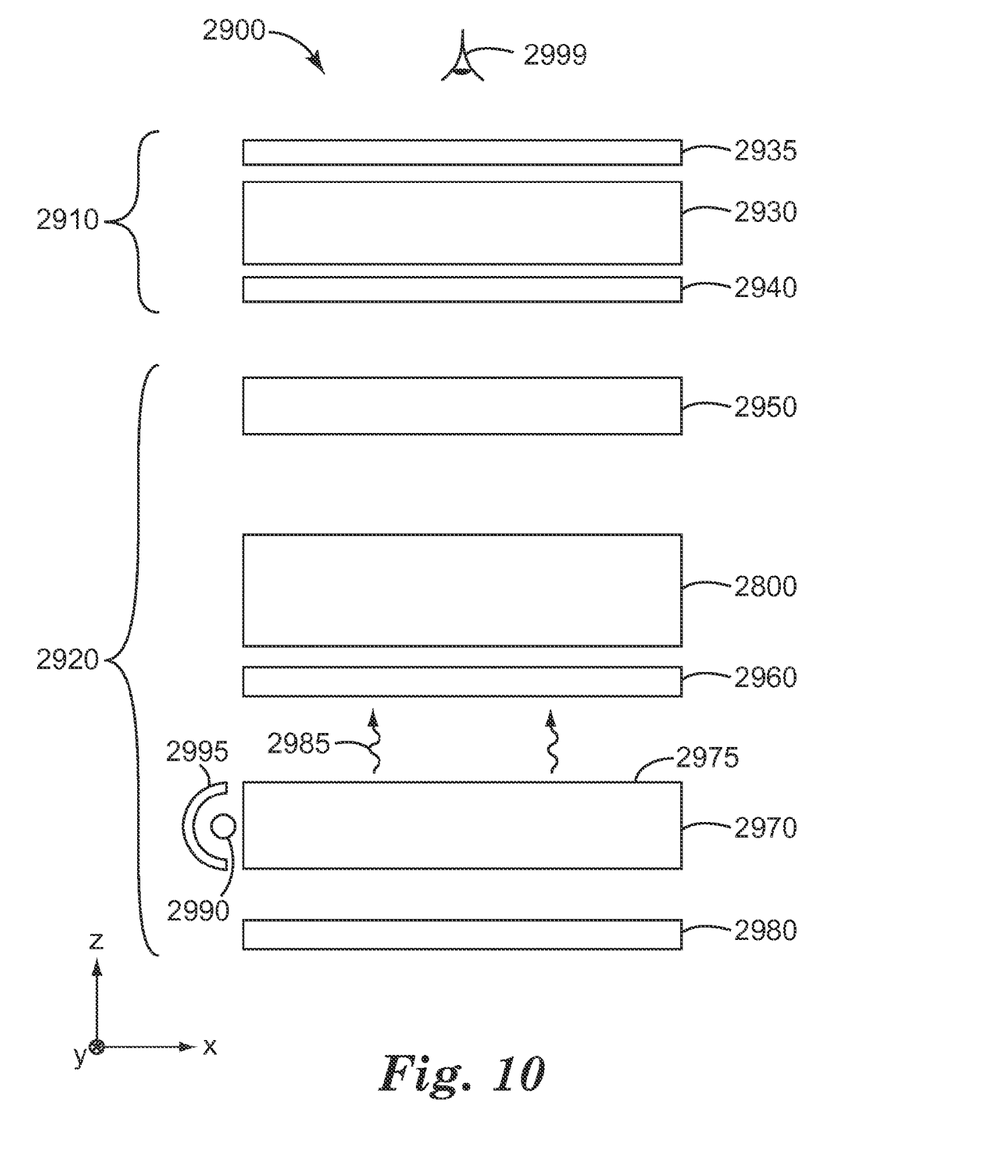
FIG. 10 is a schematic side-view of a display system.

FIG. 10 is a schematic side-view of a display system 2900 for displaying information to a viewer 2999. The display system includes a liquid crystal panel 2910 that is disposed on and is illuminated by a backlight 2920. Liquid crystal panel 2910 includes a liquid crystal cell 2930 that is disposed between linear light absorbing polarizers 2935 and 2940. In some cases, such as when display system 2900 displays an image to viewer 2999, liquid crystal panel 2910 can be pixilated.

Backlight 2920 includes a lightguide 2970 that receives light through an edge of the lightguide from a lamp 2990 that is housed in a side reflector 2995, a back reflector 2980 for reflecting light that is incident on the back reflector toward viewer 2999, an optical diffuser 2960 for homogenizing light 2985 that exits from an emitting surface 2975 of the lightguide, and optical stack 2800 disposed between the optical diffuser and a reflective polarizer 2950.

Figure 11:
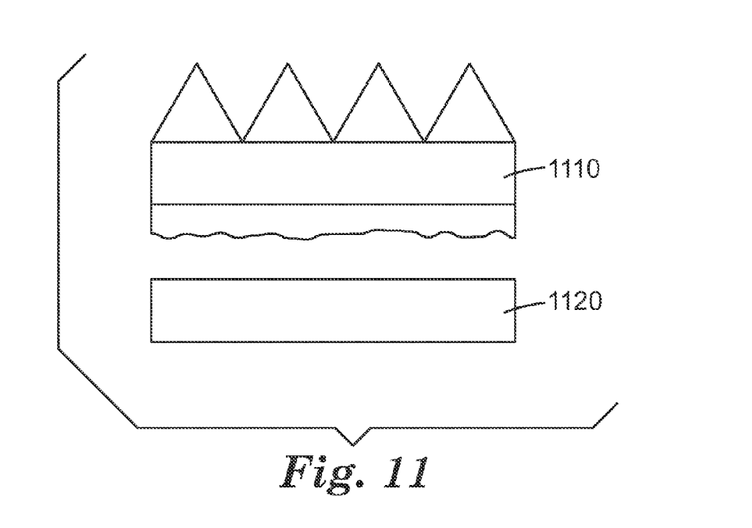
FIG. 11 is a schematic side view of top and bottom structured optical films.

The optical stack 2800 can include one or more structured optical films 100. In some cases, two structured optical films 100 are utilized where the linear prism structures of the two structured optical films 100 are orthogonally oriented relative to each other. For example, FIG. 11 is a schematic side view of a top film 1110, similar to film 100 that is disposed on bottom film 1120, also similar to film 100. In some cases, the bottom major surface of film 1120 may be smooth. Closely packed lenslets 160 can face lightguide 2970 and prismatic microstructures can face away from the lightguide.

Optical stack 2800 can enhance the brightness, such as the on-axis brightness, of the display system. At the same time, the closely packed lenslets 160 of the optical stack have sufficiently low optical clarities to mask physical defects such as scratches, and hide and/or eliminate optical defects such as moiré and color mura and at the same time reduce or eliminate sparkle.

Reflective polarizer 2950 substantially reflects light that has a first polarization state and substantially transmits light that has a second polarization state, where the two polarization states are mutually orthogonal. For example, the average reflectance of reflective polarizer 2950 in the visible for the polarization state that is substantially reflected by the reflective polarizer is at least about 50%, or at least about 60%, or at least about 70%, or at least about 80%, or at least about 90%, or at least about 95%. As another example, the average transmittance of reflective polarizer 2950 in the visible for the polarization state that is substantially transmitted by the reflective polarizer is at least about 50%, or at least about 60%, or at least about 70%, or at least about 80%, or at least about 90%, or at least about 95%, or at least about 97%, or at least about 98%, or at least about 99%. In some cases, reflective polarizer 2950 substantially reflects light having a first linear polarization state (for example, along the x-direction) and substantially transmits light having a second linear polarization state (for example, along the y-direction).

Any suitable type of reflective polarizer may be used for reflective polarizer layer 2950 such as, for example, a multilayer optical film (MOF) reflective polarizer, a diffusely reflective polarizing film (DRPF) having a continuous phase and a disperse phase, such as a Vikuiti™ Diffuse Reflective Polarizer Film ("DRPF") available from 3M Company, St. Paul, Minn., a wire grid reflective polarizer described in, for example, U.S. Pat. No. 6,719,426, or a cholesteric reflective polarizer.

For example, in some cases, reflective polarizer 2950 can be or include an MOF reflective polarizer, formed of alternating layers of different polymer materials, where one of the sets of alternating layers is formed of a birefringent material, where the refractive indices of the different materials are matched for light polarized in one linear polarization state and unmatched for light in the orthogonal linear polarization state. In such cases, an incident light in the matched polarization state is substantially transmitted through reflective polarizer 2950 and an incident light in the unmatched polarization state is substantially reflected by reflective polarizer 2950. In some cases, an MOF reflective polarizer 2950 can include a stack of inorganic dielectric layers.

As another example, reflective polarizer 2950 can be or include a partially reflecting layer that has an intermediate on-axis average reflectance in the pass state. For example, the partially reflecting layer can have an on-axis average reflectance of at least about 90% for visible light polarized in a first plane, such as the xy-plane, and an on-axis average reflectance in a range from about 25% to about 90% for visible light polarized in a second plane, such as the xz-plane, perpendicular to the first plane. Such partially reflecting layers are described in, for example, U.S. Patent Publication No. 2008/064133, the disclosure of which is incorporated herein in its entirety by reference.

In some cases, reflective polarizer 2950 can be or include a circular reflective polarizer, where light circularly polarized in one sense, which may be the clockwise or counterclockwise sense (also referred to as right or left circular polarization), is preferentially transmitted and light polarized in the opposite sense is preferentially reflected. One type of circular polarizer includes a cholesteric liquid crystal polarizer.

In some cases, reflective polarizer 2950 can be a multilayer optical film that reflects or transmits light by optical interference, such as those described in Provisional U.S. Patent Application No. 61/116,132, filed Nov. 19, 2009; Provisional U.S. Patent Application No. 61/116,291, filed Nov. 19, 2008; Provisional U.S. Patent Application No. 61/116,294, filed Nov. 19, 2008; Provisional U.S. Patent Application No. 61/116,295, filed Nov. 19, 2008; Provisional U.S. Patent Application No. 61/116,295, filed Nov. 19, 2008; and International Patent Application No. PCT/US 2008/060311, filed May 19, 2008, claiming priority from Provisional U.S. Patent Application No. 60/939,085, filed May 20, 2007; all incorporated herein by reference in their entirety.

Optical diffuser 2960 has the primary functions of hiding or masking lamp 2990 and homogenizing light 2985 that is emitted by lightguide 2970. Optical diffuser 2960 has a high optical haze and/or a high diffuse optical reflectance and/or transmittance. For example, in some cases, the optical haze of the optical diffuser is not less than about 40%, or not less than about 50%, or not less than about 60%, or not less than about 70%, or not less than about 80%, or not less than about 85%, or not less than about 90%, or not less than about 95%. As another example, the diffuse optical reflectance of the optical diffuser is not less than about 30%, or not less than about 40%, or not less than about 50%, or not less than about 60%.

Optical diffuser 2960 can be or include any optical diffuser that may be desirable and/or available in an application. For example, optical diffuser 2960 can be or include a surface diffuser, a volume diffuser, or a combination thereof. For example, optical diffuser 2960 can include a plurality of particles having a first index of refraction $n_1$ dispersed in a binder or host medium having a different index of refraction $n_2$, where the difference between the two indices of refraction is at least about 0.01, or at least about 0.02, or at least about 0.03, or at least about 0.04, or at least about 0.05.

Back reflector 2980 receives light that is emitted by the lightguide away from viewer 2999 along the negative z-direction and reflects the received light towards the viewer. Display systems such as display system 2900 where lamp 2990 is placed along an edge of a lightguide, are generally referred to as edge-lit or backlit displays or optical systems. In some cases, the back reflector can be partially reflective and partially transmissive. In some cases, the back reflector can be structured, for example, have a structured surface.

Back reflector 2980 can be any type reflector that may be desirable and/or practical in an application. For example, the back reflector can be a specular reflector, a semi-specular or semi-diffuse reflector, or a diffuse reflector, such as those disclosed in International Patent Application No. PCT/US 2008/064115, filed May 19, 2008, claiming priority from Provisional U.S. Patent Application No. 60/939,085, filed May 20, 2007, both incorporated herein by reference in their entirety. For example, the reflector can be an aluminized film or a multi-layer polymeric reflective film, such as an enhanced specular reflector (ESR) film (available from 3M Company, St. Paul, Minn.). As another example, back reflector 2980 can be a diffuse reflector having a white appearance.

As used herein, terms such as "vertical", "horizontal", "above", "below", "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if the image in FIG. 1 is flipped as compared to the orientation in the figure, first major surface 110 is still considered to be the top major surface.

Some of the advantages of the disclosed systems and constructions are further illustrated by the following example. The particular materials, amounts and dimensions recited in this example, as well as other conditions and details, should not be construed to unduly limit the present disclosure.

EXAMPLES

Figure 3:
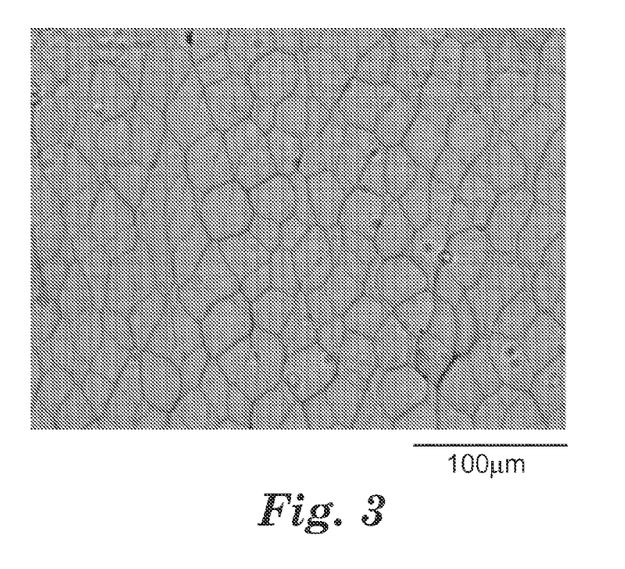
FIG. 3 is a photomicrograph the closely packed lenslet side of a sample (Example A)

A film with a matte coating (Example A) was produced by microreplication on a 50 micrometer thick polyethylene terephthalate (PET) substrate using a patterned roll prepared with the cutting tool system previously described in International Patent Application No. PCT/US 2010/036018, using a machine pitch of 5.4 micrometers. A photomicrograph of a sample (Example A) from the film (approximately 400 micrometers by 400 micrometers) is shown in FIG. 3.

Figure 4:
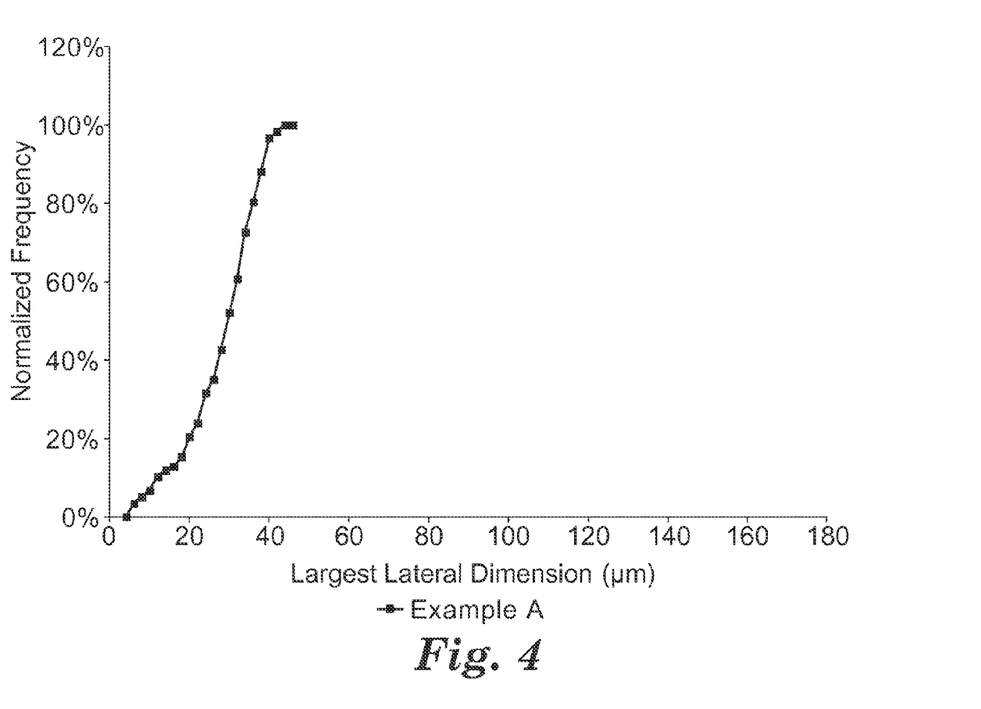
FIG. 4 is a graph of the cumulative distribution of largest lateral dimension for the sample (Example A)

The surface (closely packed lenslets) shown in FIG. 1 was then characterized. First, atomic force microscopy (AFM) were used to prepare height maps of the sample. For each peak region that was identified, area, lateral dimensions and height were measured using MATLAB image analysis software (available from The MathWorks Inc., Natick Mass.). The mean area for peak regions across this sample was about 331 square micrometers. Mean largest lateral dimension was about 29 micrometers, and mean smallest lateral dimension was about 16 micrometers. The cumulative distribution of largest lateral dimension for the sample (Example A) is shown in FIG. 4.

Figure 5:
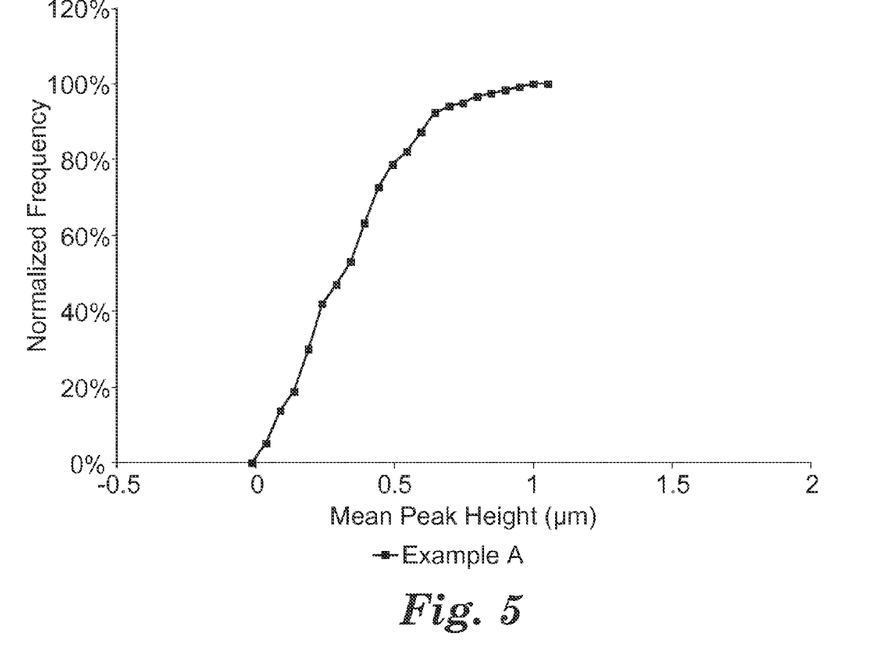
FIG. 5 is a graph of the cumulative distribution of mean peak height for Example A.
Figure 6:
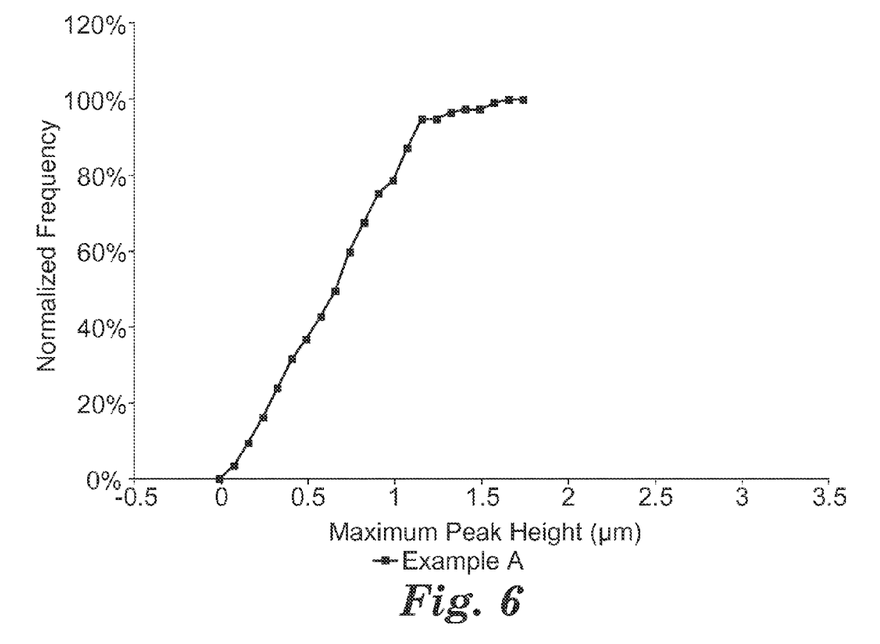
FIG. 6 is a graph of the cumulative distribution for maximum peak height for Example A.

Minimum and maximum peak heights were also determined for Example A. Maximum peak height was computed as maximum z-value within the peak region minus the minimum z-value on the perimeter of the peak region. Minimum peak height was calculated as the maximum z-value in the peak region minus the maximum z-value on the perimeter of the peak region. Mean peak height was then maximum z-value in the peak region minus the mean z-value on the perimeter of the peak region. Mean peak height maximum was about 0.7 micrometers and mean peak height minimum was about 0.1 micrometers. The cumulative distribution of mean peak height for Example A is shown in FIG. 5, and the cumulative distribution for maximum peak height for Example A is shown in FIG. 6.

Figure 7:
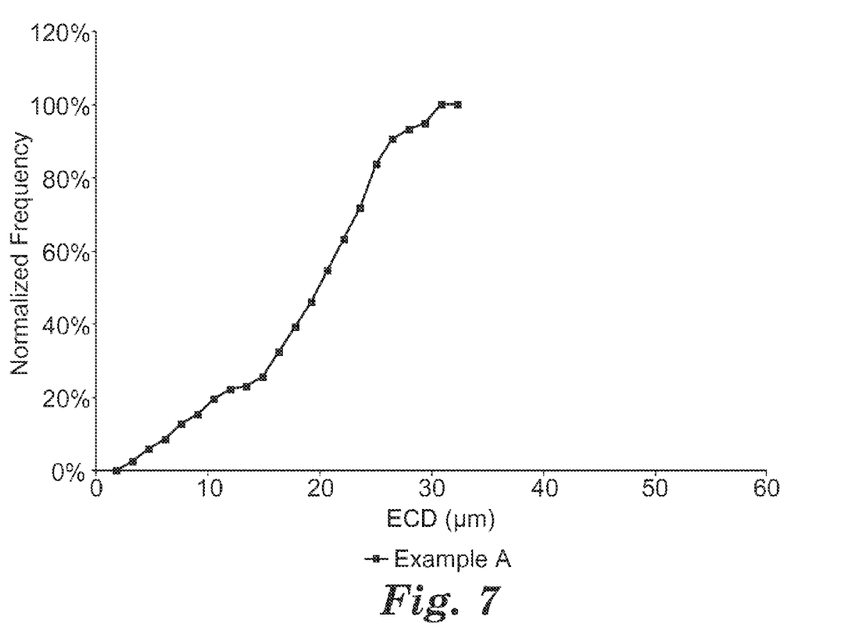
FIG. 7 is a graph of the cumulative distribution of ECD for the sample (Example A)

Equivalent circular diameter (ECD) of a peak region for Example A was determined as the diameter of a circle having the same area as the given region. For the sample (Example A) shown, the mean ECD across peak regions of the sample was approximately 19 micrometers. The cumulative distribution of ECD for the sample (Example A) is shown in FIG. 7.

Focal length was measured using an optical microscope for a representative collection of lenslets defined by the peak regions. The procedure was to image a distant point source in each lenslet and then to measure the distance between the focal point of the lenslet and the lenslet surface. The microscope was first focused on the edge of the lenslet using a wide source aperture to illuminate the full lenslet. Then, switching to a narrow source aperture, the microscope stage was raised until the lenslet's focal spot was seen. The focal length was then the distance that the stage was raised. For this sample (Example A), the focal length was approximately 184 micrometers.

Figure 8:
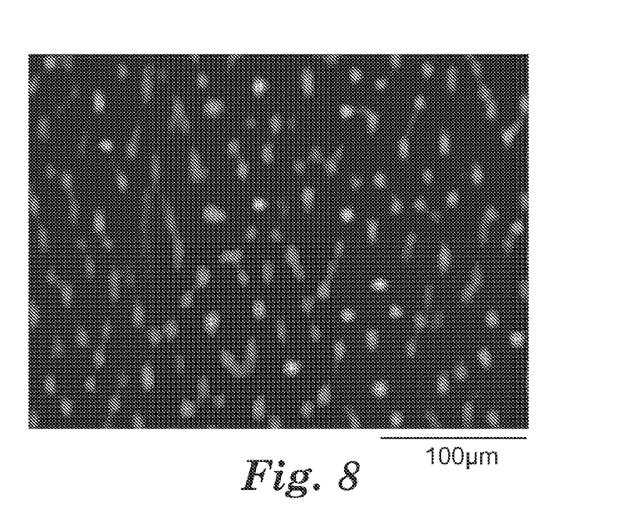
FIG. 8 is a photomicrograph of the sample (Example A) illuminated using substantially collimated light.
Figure 9:
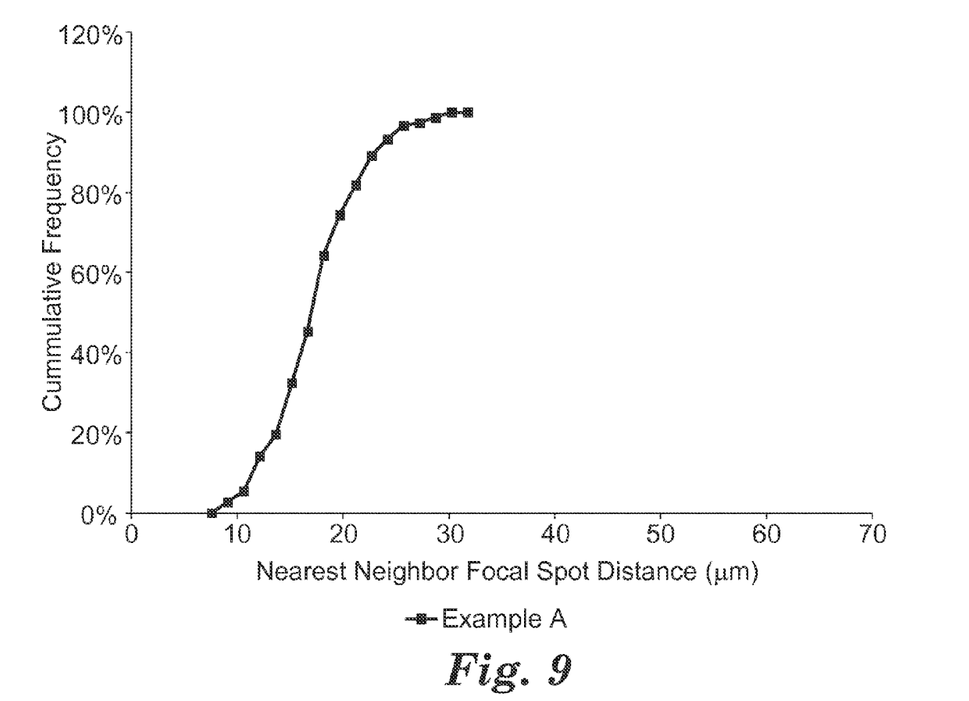
FIG. 9 is a graph of the cumulative distribution of nearest neighbor focal spot (the highest intensity points in FIG. 8) distances.

Next, the sample was illuminated using substantially collimated light to produce an image shown in FIG. 8. Using MATLAB image analysis software, the distances between focal spots (the highest intensity points in FIG. 8) was measured to determine for each focal spot the distance to its nearest neighbor. The cumulative distribution of nearest neighbor focal spot distances is shown in FIG. 9. Mean nearest neighbor focal spot distance was about 18 micrometers.

Haze of the film was then measured using a Haze-Gard Plus haze meter from BYK-Gardiner, and was found to be 6%.

Thus, embodiments of STRUCTURED OPTICAL FILM are disclosed. One skilled in the art will appreciate that the optical films and film articles described herein can be practiced with embodiments other than those disclosed. The disclosed embodiments are presented for purposes of illustration and not limitation.

The following are exemplary embodiments according to the present disclosure:

Item 1. An optical film, comprising:
a first structured major surface comprising a plurality of linear prisms extending along a same first direction; and
an opposing second structured major surface comprising a plurality of closely packed lenslets, each lenslet having a largest lateral dimension D, an equivalent circular diameter ECD and a finite focal length f corresponding to a focal spot, the plurality of closely packed lenslets having an average largest lateral dimension $D_{avg}$, an average equivalent circular diameter $ECD_{avg}$ and an average focal length $f_{avg}$, $ECD_{avg}/f_{avg}$ being in a range from about 0.05 to about 0.20, $D_{avg}$ being less than about 50 micrometers, less than about 30% of the second structured major surface having a slope magnitude that is greater than about 5 degrees.

Item 2. The optical film of item 1, wherein at least 90% of second structured major surface is covered by the lenslets.

Item 3. The optical film of item 1, wherein at least 94% of second structured major surface is covered by the lenslets.

Item 4. The optical film of item 1, wherein at least 98% of second structured major surface is covered by the lenslets.

Item 5. The optical film of item 1, wherein at least 99% of second structured major surface is covered by the lenslets.

Item 6. The optical film of item 1, wherein $ECD_{avg}/f_{avg}$ is in a range from about 0.05 to about 0.19.

Item 7. The optical film of item 1, wherein $ECD_{avg}/f_{avg}$ is in a range from about 0.06 to about 0.19.

Item 8. The optical film of item 1, wherein $ECD_{avg}/f_{avg}$ is in a range from about 0.06 to about 0.18.

Item 9. The optical film of item 1, wherein $ECD_{avg}/f_{avg}$ is in a range from about 0.07 to about 0.18.

Item 10. The optical film of item 1, wherein $D_{avg}$ is less than about 45 micrometers.

Item 11. The optical film of item 1, wherein $D_{avg}$ is less than about 40 micrometers.

Item 12. The optical film of item 1, wherein at least 80% of the lenslets in the plurality of lenslets have a largest lateral dimension D that is less than about 50 micrometers.

Item 13. The optical film of item 1, wherein at least 80% of the lenslets in the plurality of lenslets have a largest lateral dimension D that is less than about 45 micrometers.

Item 14. The optical film of item 1, wherein at least 80% of the lenslets in the plurality of lenslets have a largest lateral dimension D that is less than about 40 micrometers.

Item 15. The optical film of item 1, wherein at least 40% of the lenslets in the plurality of lenslets have a largest lateral dimension D that is less than about 32 micrometers.

Item 16. The optical film of item 1, wherein at least 20% of the lenslets in the plurality of lenslets have a largest lateral dimension D that is less than about 24 micrometers.

Item 17. The optical film of item 1, wherein less than about 20% of the second structured major surface has a slope magnitude that is greater than about 5 degrees.

Item 18. The optical film of item 1, wherein less than about 15% of the second structured major surface having a slope magnitude that is greater than about 5 degrees.

Item 19. The optical film of item 1, wherein less than about 10% of the second structured major surface has a slope magnitude that is greater than about 5 degrees.

Item 20. The optical film of item 1, wherein less than about 40% of the second structured major surface has a slope magnitude that is greater than about 4 degrees.

Item 21. The optical film of item 1, wherein less than about 30% of the second structured major surface has a slope magnitude that is greater than about 4 degrees.

Item 22. The optical film of item 1, wherein less than about 25% of the second structured major surface has a slope magnitude that is greater than about 4 degrees.

Item 24. The optical film of item 1, wherein less than about 50% of the second structured major surface has a slope magnitude that is greater than about 3 degrees.

Item 25. The optical film of item 1, wherein less than about 45% of the second structured major surface has a slope magnitude that is greater than about 3 degrees.

Item 26. The optical film of item 1, wherein less than about 40% of the second structured major surface has a slope magnitude that is greater than about 3 degrees.

Item 27. The optical film of item 1, wherein less than about 80% of the second structured major surface has a slope magnitude that is greater than about 2 degrees.

Item 28. The optical film of item 1, wherein less than about 70% of the second structured major surface has a slope magnitude that is greater than about 2 degrees.

Item 29. The optical film of item 1, wherein less than about 65% of the second structured major surface has a slope magnitude that is greater than about 2 degrees.

Item 30. The optical film of item 1, wherein at least 80% of the lenslets in the plurality of lenslets have an equivalent circular diameter ECD that is less than about 27 micrometers.

Item 31. The optical film of item 1, wherein at least 40% of the lenslets in the plurality of lenslets have an equivalent circular diameter ECD that is less than about 20 micrometers.

Item 32. The optical film of item 1, wherein at least 20% of the lenslets in the plurality of lenslets have an equivalent circular diameter ECD that is less than about 14 micrometers.

Item 33. The optical film of item 1, wherein at least 90% of the lenslets in the plurality of lenslets have a peak height that is less than about 1.5 micrometers.

Item 34. The optical film of item 1, wherein at least 80% of the lenslets in the plurality of lenslets have a peak height that is less than about 1.2 micrometers.

Item 35. The optical film of item 1, wherein at least 40% of the lenslets in the plurality of lenslets have a peak height that is less than about 0.7 micrometers.

Item 36. The optical film of item 1, wherein at least 90% of the lenslets in the plurality of lenslets have a nearest neighbor focal spot distance that is less than about 30 micrometers.

Item 37. The optical film of item 1, wherein at least 90% of the lenslets in the plurality of lenslets have a nearest neighbor focal spot distance that is less than about 25 micrometers.

Item 38. The optical film of item 1, wherein at least 40% of the lenslets in the plurality of lenslets have a nearest neighbor focal spot distance that is less than about 18 micrometers.

Item 39. The optical film of item 1, wherein at least 20% of the lenslets in the plurality of lenslets have a nearest neighbor focal spot distance that is less than about 15 micrometers.

Item 40. The optical film of item 1, wherein the second structured major surface has an optical haze in a range from about 3% to about 25%.

Item 41. The optical film of item 1, wherein the second structured major surface has an optical haze in a range from about 5% to about 20%.

Item 42. The optical film of item 1, wherein $f_{avg}$ is less than about 250 micrometers.

Item 43. The optical film of item 1, wherein $f_{avg}$ is less than about 225 micrometers.

Item 44. The optical film of item 1, wherein $f_{avg}$ is less than about 200 micrometers.

Item 45. The optical film of item 1, wherein an average effective transmission of the optical film is not less or is less than by no more than about 10% as compared to an optical film that has the same construction except that the second major surface is not structured.

Item 46. The optical film of item 1 having an average effective transmission of at least 1.3.

Item 47. The optical film of item 1, wherein the second structured major surface scatters light in a first direction with a first viewing angle $A_H$ and in a second direction orthogonal to the first direction with a second viewing angle $A_V$ substantially equal to $A_H$.

Item 48. The optical film of item 47, wherein a difference between $A_V$ and $A_H$ is less than 10 degrees.

Item 49. The optical film of item 1, wherein the second structured major surface scatters light in a first direction with a first viewing angle $A_H$ and in a second direction orthogonal to the first direction with a second viewing angle $A_V$ substantially different from $A_H$.

Item 50. The optical film of item 49, wherein a difference between $A_V$ and $A_H$ is greater than 15 degrees.

Item 51. An optical stack comprising the optical film of item 1 disposed on a light directing film comprising a plurality of extending along a same second direction different than the first direction.

Item 52. The optical stack of item 51 further comprising a reflective polarizer, the optical film of claim 1 being disposed between the reflective polarizer and the light directing film.

Item 53. The optical stack of item 52, wherein the reflective polarizer layer comprises alternating layers, at least one of the alternating layers comprising a birefringent material.

Item 54. The optical stack of item 52, wherein the reflective polarizer layer comprises a wire grid reflective polarizer.

Item 55. The optical stack of item 52, wherein the reflective polarizer layer comprises a cholesteric reflective polarizer.

Item 56. The optical stack of item 52, wherein the reflective polarizer layer comprises a plurality of substantially parallel fibers, the fibers comprising a birefringent material.

Item 57. The optical stack of item 52, wherein the reflective polarizer layer comprises a diffusely reflective polarizing film (DRPF).

Item 58. An optical film, comprising:
a first structured major surface comprising a plurality of linear prisms extending along a same first direction; and
an opposing second structured major surface comprising a plurality of closely packed lenslets, each lenslet having an equivalent circular diameter ECD and a finite focal length f corresponding to a focal spot, the plurality of closely packed lenslets having an average equivalent circular diameter $ECD_{avg}$ and an average focal length $f_{avg}$, $ECD_{avg}/f_{avg}$ being in a range from about 0.05 to about 0.20, at least 90% of the lenslets in the plurality of closely packed lenslets having a nearest neighbor focal spot distance of less than about 30 micrometers, less than about 30% of the second structured major surface having a slope magnitude that is greater than about 5 degrees.

Item 59. The optical film of item 58, wherein at least 90% of second structured major surface is covered by the lenslets.

Item 60. The optical film of item 58, wherein at least 94% of second structured major surface is covered by the lenslets.

Item 61. The optical film of item 58, wherein at least 98% of second structured major surface is covered by the lenslets.

Item 62. The optical film of item 58, wherein at least 99% of second structured major surface is covered by the lenslets.

Item 63. The optical film of item 58, wherein $ECD_{avg}/f_{avg}$ is in a range from about 0.05 to about 0.19.

Item 64. The optical film of item 58, wherein $ECD_{avg}/f_{avg}$ is in a range from about 0.06 to about 0.19.

Item 65. The optical film of item 58, wherein $ECD_{avg}/f_{avg}$ is in a range from about 0.06 to about 0.18.

Item 66. The optical film of item 58, wherein $ECD_{avg}/f_{avg}$ is in a range from about 0.07 to about 0.18.

Item 67. The optical film of item 58, wherein $D_{avg}$ is less than about 50 micrometers.

Item 68. The optical film of item 58, wherein $D_{avg}$ is less than about 45 micrometers.

Item 69. The optical film of item 58, wherein $D_{avg}$ is less than about 40 micrometers.

Item 70. The optical film of item 58, wherein at least 80% of the lenslets in the plurality of lenslets have a largest lateral dimension D that is less than about 50 micrometers.

Item 71. The optical film of item 58, wherein at least 80% of the lenslets in the plurality of lenslets have a largest lateral dimension D that is less than about 45 micrometers.

Item 72. The optical film of item 58, wherein at least 80% of the lenslets in the plurality of lenslets have a largest lateral dimension D that is less than about 40 micrometers.

Item 73. The optical film of item 58, wherein at least 40% of the lenslets in the plurality of lenslets have a largest lateral dimension D that is less than about 32 micrometers.

Item 74. The optical film of item 58, wherein at least 20% of the lenslets in the plurality of lenslets have a largest lateral dimension D that is less than about 24 micrometers.

Item 75. The optical film of item 58, wherein less than about 20% of the second structured major surface has a slope magnitude that is greater than about 5 degrees.

Item 76. The optical film of item 58, wherein less than about 15% of the second structured major surface having a slope magnitude that is greater than about 5 degrees.

Item 77. The optical film of item 58, wherein less than about 10% of the second structured major surface has a slope magnitude that is greater than about 5 degrees.

Item 78. The optical film of item 58, wherein less than about 40% of the second structured major surface has a slope magnitude that is greater than about 4 degrees.

Item 79. The optical film of item 58, wherein less than about 30% of the second structured major surface has a slope magnitude that is greater than about 4 degrees.

Item 80. The optical film of item 58, wherein less than about 25% of the second structured major surface has a slope magnitude that is greater than about 4 degrees.

Item 81. The optical film of item 58, wherein less than about 50% of the second structured major surface has a slope magnitude that is greater than about 3 degrees.

Item 82. The optical film of item 58, wherein less than about 45% of the second structured major surface has a slope magnitude that is greater than about 3 degrees.

Item 83. The optical film of item 58, wherein less than about 40% of the second structured major surface has a slope magnitude that is greater than about 3 degrees.

Item 84. The optical film of item 58, wherein less than about 80% of the second structured major surface has a slope magnitude that is greater than about 2 degrees.

Item 85. The optical film of item 58, wherein less than about 70% of the second structured major surface has a slope magnitude that is greater than about 2 degrees.

Item 86. The optical film of item 58, wherein less than about 65% of the second structured major surface has a slope magnitude that is greater than about 2 degrees.

Item 87. The optical film of item 58, wherein at least 80% of the lenslets in the plurality of lenslets have an equivalent circular diameter ECD that is less than about 27 micrometers.

Item 88. The optical film of item 58, wherein at least 40% of the lenslets in the plurality of lenslets have an equivalent circular diameter ECD that is less than about 20 micrometers.

Item 89. The optical film of item 58, wherein at least 20% of the lenslets in the plurality of lenslets have an equivalent circular diameter ECD that is less than about 14 micrometers.

Item 90. The optical film of item 58, wherein at least 90% of the lenslets in the plurality of lenslets have a peak height that is less than about 1.5 micrometers.

Item 91. The optical film of item 58, wherein at least 80% of the lenslets in the plurality of lenslets have a peak height that is less than about 1.2 micrometers.

Item 92. The optical film of item 58, wherein at least 40% of the lenslets in the plurality of lenslets have a peak height that is less than about 0.7 micrometers.

Item 93. The optical film of item 58, wherein at least 90% of the lenslets in the plurality of lenslets have a nearest neighbor focal spot distance that is less than about 25 micrometers.

Item 94. The optical film of item 58, wherein at least 40% of the lenslets in the plurality of lenslets have a nearest neighbor focal spot distance that is less than about 18 micrometers.

Item 95. The optical film of item 58, wherein at least 20% of the lenslets in the plurality of lenslets have a nearest neighbor focal spot distance that is less than about 15 micrometers.

Item 96. The optical film of item 58, wherein the second structured major surface has an optical haze in a range from about 3% to about 25%.

Item 97. The optical film of item 58, wherein the second structured major surface has an optical haze in a range from about 5% to about 20%.

Item 98. The optical film of item 58, wherein $f_{avg}$ is less than about 250 micrometers.

Item 99. The optical film of item 58, wherein $f_{avg}$ is less than about 225 micrometers.

Item 100. The optical film of item 58, wherein $f_{avg}$ is less than about 200 micrometers.

Item 101. The optical film of item 58, wherein an average effective transmission of the optical film is not less or is less than by no more than about 10% as compared to an optical film that has the same construction except that the second major surface is not structured.

Item 102. The optical film of item 58 having an average effective transmission of at least 1.3.

Item 103. The optical film of item 58, wherein the second structured major surface scatters light in a first direction with a first viewing angle $A_H$ and in a second direction orthogonal to the first direction with a second viewing angle $A_V$ substantially equal to $A_H$.

Item 104. The optical film of item 103, wherein a difference between $A_V$ and $A_H$ is less than 10 degrees.

Item 105. The optical film of item 58, wherein the second structured major surface scatters light in a first direction with a first viewing angle $A_H$ and in a second direction orthogonal to the first direction with a second viewing angle $A_V$ substantially different from $A_H$.

Item 106. The optical film of item 105, wherein a difference between $A_V$ and $A_H$ is greater than 15 degrees.

Item 107. An optical stack comprising the optical film of item 58 disposed on a light directing film comprising a plurality of extending along a same second direction different than the first direction.

Item 108. The optical stack of item 107 further comprising a reflective polarizer, the optical film of item 58 being disposed between the reflective polarizer and the light directing film.

Item 109. The optical stack of item 107, wherein the reflective polarizer layer comprises alternating layers, at least one of the alternating layers comprising a birefringent material.

Item 110. The optical stack of item 107, wherein the reflective polarizer layer comprises a wire grid reflective polarizer.

Item 111. The optical stack of item 107, wherein the reflective polarizer layer comprises a cholesteric reflective polarizer.

Item 112. The optical stack of item 107, wherein the reflective polarizer layer comprises a plurality of substantially parallel fibers, the fibers comprising a birefringent material.

Item 113. The optical stack of item 107, wherein the reflective polarizer layer comprises a diffusely reflective polarizing film (DRPF).

Item 114. An optical film, comprising:
a first structured major surface comprising a plurality of linear prisms extending along a same first direction; and
an opposing second structured major surface comprising a plurality of closely packed lenslets, each lenslet having a largest lateral dimension D, the plurality of closely packed lenslets having an average largest lateral dimension $D_{avg}$, $D_{avg}$ being less than about 50 micrometers, at least 90% of the lenslets in the plurality of closely packed lenslets having a nearest neighbor focal spot distance of less than about 30 micrometers, less than about 30% of the second structured major surface having a slope magnitude that is greater than about 5 degrees.

Item 115. The optical film of item 114, wherein at least 90% of second structured major surface is covered by the lenslets.

Item 116. The optical film of item 114, wherein at least 94% of second structured major surface is covered by the lenslets.

Item 117. The optical film of item 114, wherein at least 98% of second structured major surface is covered by the lenslets.

Item 118. The optical film of item 114, wherein at least 99% of second structured major surface is covered by the lenslets.

Item 119. The optical film of item 114, wherein $D_{avg}$ is less than about 45 micrometers.

Item 120. The optical film of item 114, wherein $D_{avg}$ is less than about 40 micrometers.

Item 121. The optical film of item 114, wherein at least 80% of the lenslets in the plurality of lenslets have a largest lateral dimension D that is less than about 50 micrometers.

Item 122. The optical film of item 114, wherein at least 80% of the lenslets in the plurality of lenslets have a largest lateral dimension D that is less than about 45 micrometers.

Item 123. The optical film of item 114, wherein at least 80% of the lenslets in the plurality of lenslets have a largest lateral dimension D that is less than about 40 micrometers.

Item 124. The optical film of item 114, wherein at least 40% of the lenslets in the plurality of lenslets have a largest lateral dimension D that is less than about 32 micrometers.

Item 125. The optical film of item 114, wherein at least 20% of the lenslets in the plurality of lenslets have a largest lateral dimension D that is less than about 24 micrometers.

Item 126. The optical film of item 114, wherein less than about 20% of the second structured major surface has a slope magnitude that is greater than about 5 degrees.

Item 127. The optical film of item 114, wherein less than about 15% of the second structured major surface having a slope magnitude that is greater than about 5 degrees.

Item 128. The optical film of item 114, wherein less than about 10% of the second structured major surface has a slope magnitude that is greater than about 5 degrees.

Item 129. The optical film of item 114, wherein less than about 40% of the second structured major surface has a slope magnitude that is greater than about 4 degrees.

Item 130. The optical film of item 114, wherein less than about 30% of the second structured major surface has a slope magnitude that is greater than about 4 degrees.

Item 131. The optical film of item 114, wherein less than about 25% of the second structured major surface has a slope magnitude that is greater than about 4 degrees.

Item 132. The optical film of item 114, wherein less than about 50% of the second structured major surface has a slope magnitude that is greater than about 3 degrees.

Item 133. The optical film of item 114, wherein less than about 45% of the second structured major surface has a slope magnitude that is greater than about 3 degrees.

Item 134. The optical film of item 114, wherein less than about 40% of the second structured major surface has a slope magnitude that is greater than about 3 degrees.

Item 135. The optical film of item 114, wherein less than about 80% of the second structured major surface has a slope magnitude that is greater than about 2 degrees.

Item 136. The optical film of item 114, wherein less than about 70% of the second structured major surface has a slope magnitude that is greater than about 2 degrees.

Item 137. The optical film of item 114, wherein less than about 65% of the second structured major surface has a slope magnitude that is greater than about 2 degrees.

Item 138. The optical film of item 114, wherein at least 90% of the lenslets in the plurality of lenslets have a nearest neighbor focal spot distance that is less than about 25 micrometers.

Item 139. The optical film of item 114, wherein at least 40% of the lenslets in the plurality of lenslets have a nearest neighbor focal spot distance that is less than about 18 micrometers.

Item 140. The optical film of item 114, wherein at least 20% of the lenslets in the plurality of lenslets have a nearest neighbor focal spot distance that is less than about 15 micrometers.

Item 141. The optical film of item 114, wherein each lenslet has an equivalent circular diameter ECD and a finite focal length f corresponding to a focal spot, the plurality of closely packed lenslets having an average equivalent circular diameter $ECD_{avg}$ and an average focal length $f_{avg}$, $ECD_{avg}/f_{avg}$ being in a range from about 0.05 to about 0.20.

Item 142. The optical film of item 141, wherein $ECD_{avg}/f_{avg}$ is in a range from about 0.05 to about 0.19.

Item 143. The optical film of item 141, wherein $ECD_{avg}/f_{avg}$ is in a range from about 0.06 to about 0.19.

Item 144. The optical film of item 141, wherein $ECD_{avg}/f_{avg}$ is in a range from about 0.06 to about 0.18.

Item 145. The optical film of item 141, wherein $ECD_{avg}/f_{avg}$ is in a range from about 0.07 to about 0.18.

Item 145. The optical film of item 141, wherein at least 80% of the lenslets in the plurality of lenslets have an equivalent circular diameter ECD that is less than about 27 micrometers.

Item 146. The optical film of item 141, wherein at least 40% of the lenslets in the plurality of lenslets have an equivalent circular diameter ECD that is less than about 20 micrometers.

Item 147. The optical film of item 141, wherein at least 20% of the lenslets in the plurality of lenslets have an equivalent circular diameter ECD that is less than about 14 micrometers.

Item 148. The optical film of item 114, wherein at least 90% of the lenslets in the plurality of lenslets have a peak height that is less than about 1.5 micrometers.

Item 149. The optical film of item 114, wherein at least 80% of the lenslets in the plurality of lenslets have a peak height that is less than about 1.2 micrometers.

Item 150. The optical film of item 114, wherein at least 40% of the lenslets in the plurality of lenslets have a peak height that is less than about 0.7 micrometers.

Item 151. The optical film of item 114, wherein the second structured major surface has an optical haze in a range from about 3% to about 25%.

Item 152. The optical film of item 114, wherein the second structured major surface has an optical haze in a range from about 5% to about 20%.

Item 153. The optical film of item 141, wherein $f_{avg}$ is less than about 250 micrometers.

Item 154 The optical film of item 141, wherein $f_{avg}$ is less than about 225 micrometers.

Item 155. The optical film of item 141, wherein $f_{avg}$ is less than about 200 micrometers.

Item 156. The optical film of item 114, wherein an average effective transmission of the optical film is not less or is less than by no more than about 10% as compared to an optical film that has the same construction except that the second major surface is not structured.

Item 157. The optical film of item 114 having an average effective transmission of at least 1.3.

Item 158. The optical film of item 114, wherein the second structured major surface scatters light in a first direction with a first viewing angle $A_H$ and in a second direction orthogonal to the first direction with a second viewing angle $A_V$ substantially equal to $A_H$.

Item 159. The optical film of item 158, wherein a difference between $A_V$ and $A_H$ is less than 10 degrees.

Item 160. The optical film of item 114, wherein the second structured major surface scatters light in a first direction with a first viewing angle $A_H$ and in a second direction orthogonal to the first direction with a second viewing angle $A_V$ substantially different from $A_H$.

Item 161. The optical film of item 160, wherein a difference between $A_V$ and $A_H$ is greater than 15 degrees.

Item 162. An optical stack comprising the optical film of item 114 disposed on a light directing film comprising a plurality of extending along a same second direction different than the first direction.

Item 163. The optical stack of item 162 further comprising a reflective polarizer, the optical film of claim 114 being disposed between the reflective polarizer and the light directing film.

Item 164. The optical stack of item 162, wherein the reflective polarizer layer comprises alternating layers, at least one of the alternating layers comprising a birefringent material.

Item 165. The optical stack of item 162, wherein the reflective polarizer layer comprises a wire grid reflective polarizer.

Item 166. The optical stack of item 162, wherein the reflective polarizer layer comprises a cholesteric reflective polarizer.

Item 167. The optical stack of item 162, wherein the reflective polarizer layer comprises a plurality of substantially parallel fibers, the fibers comprising a birefringent material.

Item 168. The optical stack of item 162, wherein the reflective polarizer layer comprises a diffusely reflective polarizing film (DRPF).

What is claimed is:

1. An optical film, comprising:
   a first structured major surface comprising a plurality of linear prisms extending along a same first direction; and
   an opposing second structured major surface comprising a plurality of closely packed lenslets, each lenslet having a largest lateral dimension D, an equivalent circular diameter ECD and a finite focal length f corresponding to a focal spot, the plurality of closely packed lenslets having an average largest lateral dimension $D_{avg}$, an average equivalent circular diameter $ECD_{avg}$ and an average focal length $f_{avg}$, $ECD_{avg}/f_{avg}$ being in a range from about 0.05 to about 0.20, $D_{avg}$ being less than about 50 micrometers, less than about 30% of the second structured major surface having a slope magnitude that is greater than about 5 degrees.

2. The optical film of claim 1, wherein at least 90% of the second structured major surface is covered by the lenslets.

3. The optical film of claim 1, wherein less than about 20% of the second structured major surface has a slope magnitude that is greater than about 5 degrees.

4. The optical film of claim 1, wherein at least 80% of the lenslets in the plurality of lenslets have an equivalent circular diameter ECD that is less than about 27 micrometers.

5. The optical film of claim 1, wherein at least 90% of the lenslets in the plurality of lenslets have a nearest neighbor focal spot distance that is less than about 25 micrometers.

6. The optical film of claim 1, wherein the second structured major surface has an optical haze in a range from about 3% to about 25%.

7. The optical film of claim 1, wherein an average effective transmission of the optical film is not less or is less than by no more than about 10% as compared to an optical film that has the same construction except that the second major surface is not structured.

8. The optical film of claim 1, having an average effective transmission of at least 1.3.

9. An optical film, comprising:
   a first structured major surface comprising a plurality of linear prisms extending along a same first direction; and
   an opposing second structured major surface comprising a plurality of closely packed lenslets, each lenslet having an equivalent circular diameter ECD and a finite focal length f corresponding to a focal spot, the plurality of closely packed lenslets having an average equivalent circular diameter $ECD_{avg}$ and an average focal length $f_{avg}$, $ECD_{avg}/f_{avg}$ being in a range from about 0.05 to about 0.20, at least 90% of the lenslets in the plurality of closely packed lenslets having a nearest neighbor focal spot distance of less than about 30 micrometers, less than about 30% of the second structured major surface having a slope magnitude that is greater than about 5 degrees.

10. The optical film of claim 9, wherein at least 90% of the second structured major surface is covered by the lenslets.

11. The optical film of claim 9, wherein less than about 20% of the second structured major surface has a slope magnitude that is greater than about 5 degrees.

12. The optical film of claim 9, wherein at least 80% of the lenslets in the plurality of lenslets have an equivalent circular diameter ECD that is less than about 27 micrometers.

13. The optical film of claim 9, wherein at least 90% of the lenslets in the plurality of lenslets have a nearest neighbor focal spot distance that is less than about 25 micrometers.

14. The optical film of claim 9, wherein the second structured major surface has an optical haze in a range from about 3% to about 25%.

15. An optical film, comprising:
a first structured major surface comprising a plurality of linear prisms extending along a same first direction; and
an opposing second structured major surface comprising a plurality of closely packed lenslets, each lenslet having a largest lateral dimension D, the plurality of closely packed lenslets having an average largest lateral dimension $D_{avg}$, $D_{avg}$ being less than about 50 micrometers, at least 90% of the lenslets in the plurality of closely packed lenslets having a nearest neighbor focal spot distance of less than about 30 micrometers, less than about 30% of the second structured major surface having a slope magnitude that is greater than about 5 degrees.

16. The optical film of claim 15, wherein at least 90% of the second structured major surface is covered by the lenslets.

17. The optical film of claim 15, wherein less than about 20% of the second structured major surface has a slope magnitude that is greater than about 5 degrees.

18. The optical film of claim 15, wherein at least 80% of the lenslets in the plurality of lenslets have an equivalent circular diameter ECD that is less than about 27 micrometers.

19. The optical film of claim 15, wherein at least 90% of the lenslets in the plurality of lenslets have a nearest neighbor focal spot distance that is less than about 25 micrometers.

20. The optical film of claim 15, wherein the second structured major surface has an optical haze in a range from about 3% to about 25%.

* * * * *